Figure 1:
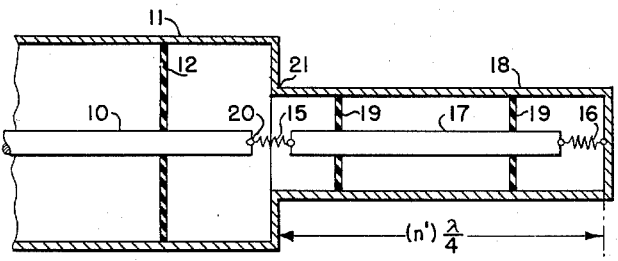

Oct. 3, 1950

H. A. WHEELER 2,524,183

TWO-TERMINAL IMPEDANCE ARRANGEMENT
FOR TRANSMISSION LINES

Filed Sept. 12, 1945

4 Sheets-Sheet 1

INVENTOR.
HAROLD A. WHEELER

BY *Harry C. Page*

ATTORNEY

INVENTOR.
HAROLD A. WHEELER

Oct. 3, 1950    H. A. WHEELER    2,524,183
TWO-TERMINAL IMPEDANCE ARRANGEMENT
FOR TRANSMISSION LINES

Filed Sept. 12, 1945    4 Sheets-Sheet 3

INVENTOR.
HAROLD A. WHEELER
BY *Nancy O. Page*
ATTORNEY

*INVENTOR.*
HAROLD A. WHEELER
BY Harry C. Page
ATTORNEY

Patented Oct. 3, 1950

2,524,183

UNITED STATES PATENT OFFICE 2,524,183

TWO-TERMINAL IMPEDANCE ARRANGEMENT FOR TRANSMISSION LINES

Harold A. Wheeler, Great Neck, N. Y., assignor, by mesne assignments, to the United States of America as represented by the Secretary of the Navy Application September 12, 1945, Serial No. 615,893

9 Claims. (Cl. 178—44)

This invention is directed to a two-terminal impedance arrangement for providing a desired terminal impedance at a given operating wave length. While the invention is subject to a wide variety of applications, it is especially suited for use as a terminating or load impedance to provide a matched termination for a transmission line over a wide range of operating conditions and will be particularly described in that connection. In such an application the arrangement of the invention is constructed to establish a terminal impedance corresponding to the characteristic impedance of the transmission line.

A terminated transmission line is used with signal-translating equipment designed for short-wave operation. Power transmitters, for example, are usually coupled through a suitable transmission line to their associated radiating antenna systems, the antenna in each case serving as the terminal impedance for the line. Again, in laboratory testing of power transmitters it is accepted practice to supply the output signal of the transmitter through a transmission line to a simulated antenna, referred to as a "dummy antenna." In many test installations of the type under consideration the dummy antenna has heretofore comprised a standard resistor or group of resistors presenting an impedance equal to the characteristic impedance of the the transmission line. This condition is difficult to maintain with such prior arrangements because the dissipation of power in common resistor elements generally produces a temperature rise therein and a resulting change in the resistor value. As a consequence, in conducting power tests, the impedance of the dummy antenna or load tends to vary with the power level of the transmitter and tends to disturb the impedance relations between the transmitter and its load.

In other prior arrangements, the dummy antenna or load for the transmitter comprises a transmission-line section having a high attenuation constant and an electrical length very much longer than the operating wave length. Such a line is referred to as a "lossy line" and its attenuation properties are relied upon to maintain uniform input resistance in spite of internal resistance variation caused by the dissipation of the transmitter power. This type of load arrangement may be undesirable in view of its large physical size.

Another prior impedance arrangement has the form of a tapered, coaxial transmission-line section having an electrical length very long with reference to the operating wave length. One of the conductive members of the section is constructed of a material having a high resistivity and the line taper is selected to establish a desired input impedance. This construction is generally similar to the lossy line arrangement just mentioned. Although the power applied thereto from the transmitter may cause a variation in the resistive member and thus a variation in the input impedance, the very long electrical length of the load arrangement suppresses, at least partially, signal reflections which may be produced. This load arrangement is also of a large physical size and may be unsuited for some installations.

It is an object of the present invention, therefore, to provide a two-terminal impedance arrangement which substantially avoids one or more of the aforementioned limitations of prior constructions.

It is another object of the invention to provide an improved two-terminal impedance arrangement for presenting at a given operating wave length a desired terminal impedance which is maintained substantially constant over a wide range of operating conditions.

It is a further object of the invention to provide an improved two-terminal impedance arrangement for establishing a desired terminal impedance at a given operating wave length and compensated to maintain its terminal impedance substantially constant over a range of operating conditions.

It is a specific object of the invention to provide an improved two-terminal impedance arrangement for matching a transmission line having a predetermined characteristic impedance at a given operating wave length.

In accordance with the invention, a two-terminal impedance arrangement for providing a desired terminal impedance at a given operating wave length comprises a pair of impedance devices subject to impedance variations in the same sense with variations in operating conditions of the arrangement. An impedance-inverting section is also included, being connected at one end in a circuit connection of one type with one of the impedance devices to the terminals of the arrangement and terminated at its opposite end in the other of the impedance devices. The impedance-inverting section has, at the operating wave length, an impedance-inverting characteristic causing impedance variations, in the same sense, of the pair of impedance devices to at least partially cancel one another at the terminals of the arrangement. The values of the pair of impedance devices are selected with reference to the desired terminal impedance and the type of connection between the aforesaid one device and the impedance-inverting section, so that the desired impedance is established at the terminals of the arrangement at the operating wave length. As used herein and in the appended claims, the expression "a circuit connection of one type" means a connection of either the series or parallel type, and the term "an impedance-inverting section" refers to a transmission line circuit which has the effect of converting a high impedance to a low impedance, such as an odd multiple of a quarter wavelength transmission line or equivalent structure.

For a better understanding of the present invention, together with other and further objects thereof, reference is had to the following description taken in connection with the accompanying drawings, and its scope will be pointed out in the appended claims.

Figure 2:
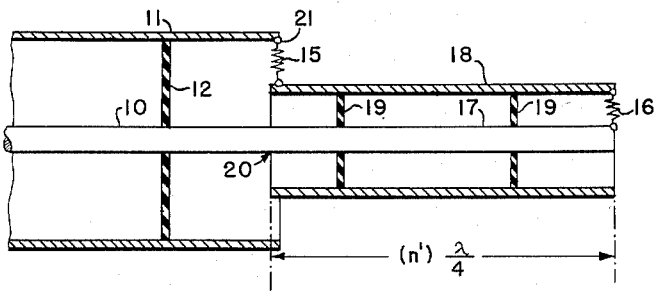
Figure 3:
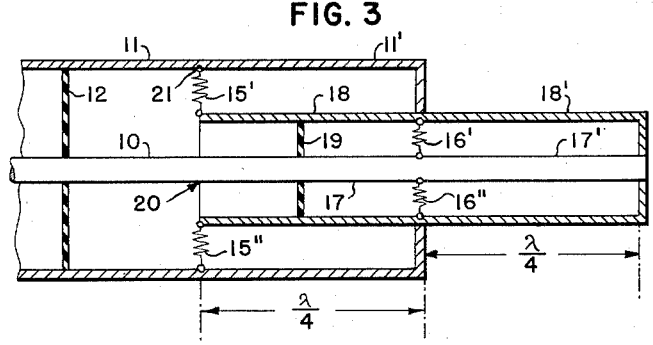
Figure 4:
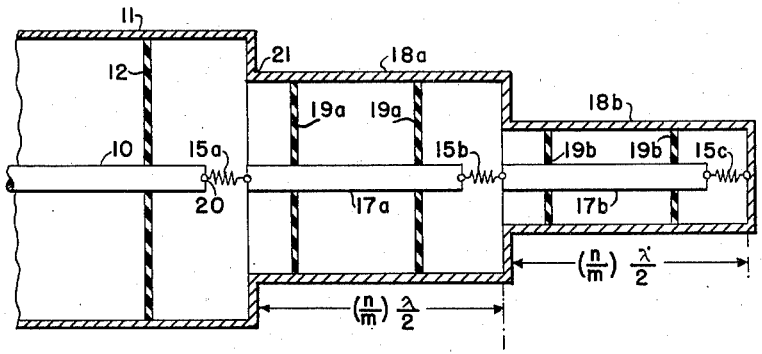
Figure 5:
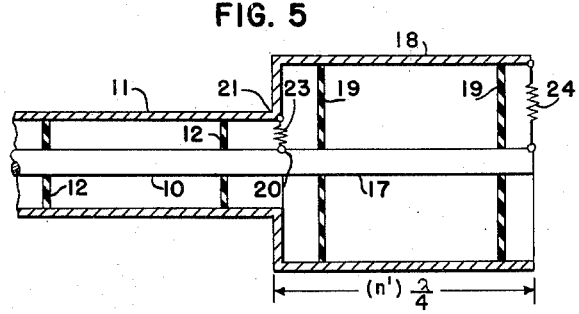
Figure 6:
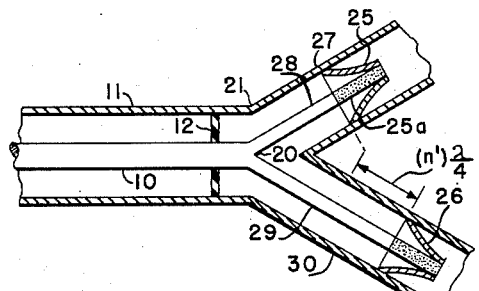
Figure 7:
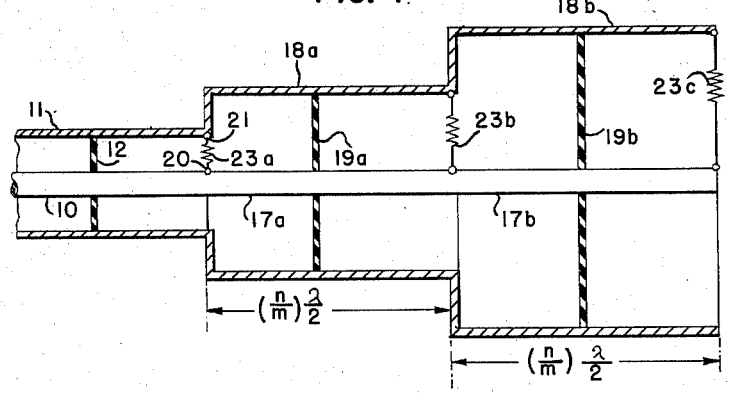
Figure 8:
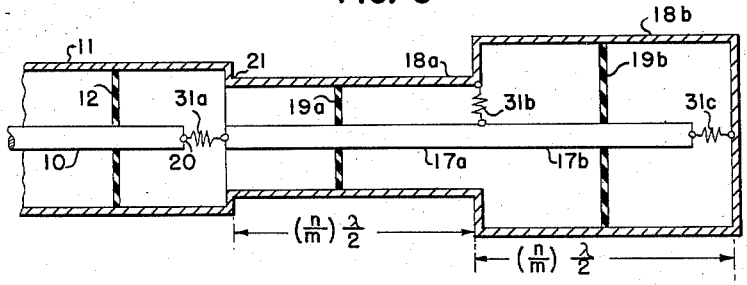
Figure 9:
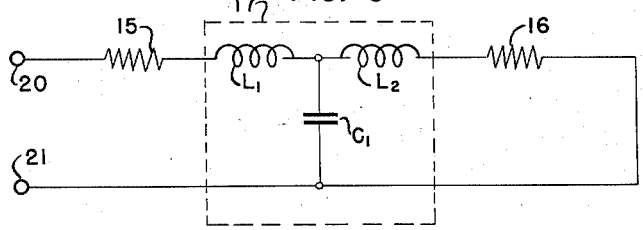
Figure 10:
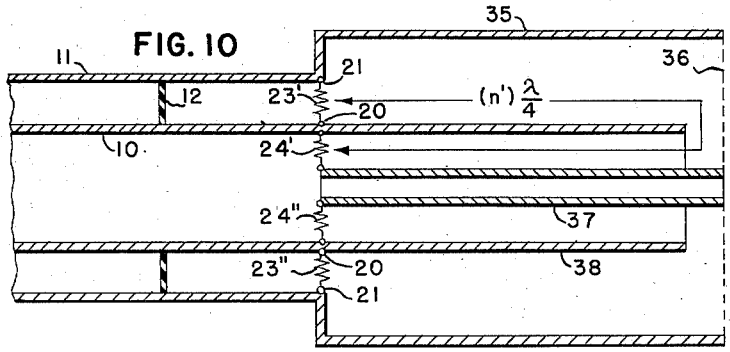
Figure 11:
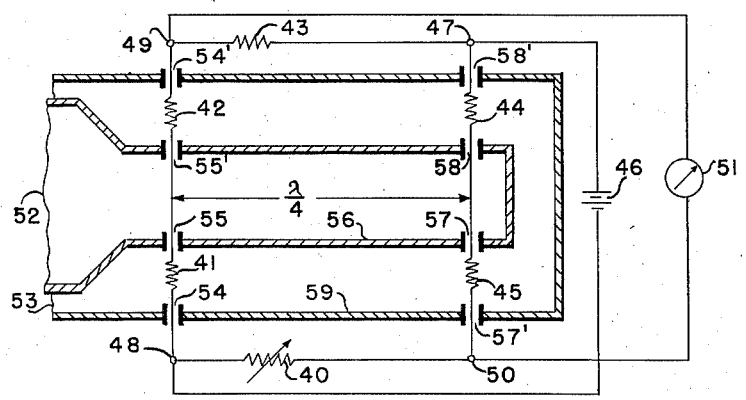
Figure 12:
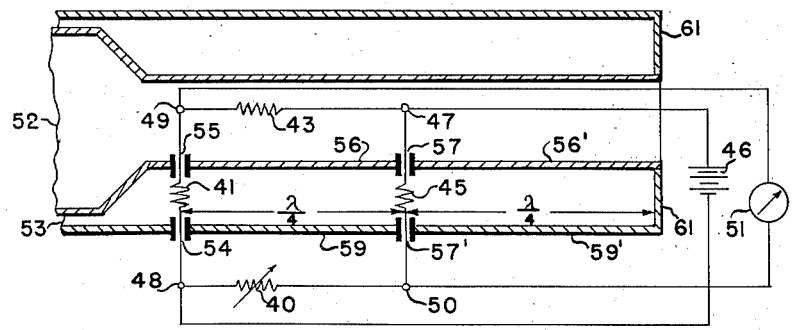

In the drawings, Fig. 1 represents an impedance arrangement of the series-connected type in accordance with the invention; Figs. 2 and 3 represent different modifications of the Fig. 1 arrangement; Fig. 4 is a further modification of Fig. 1 utilized in explaining the construction of any similar impedance arrangement of the series-connected type; Fig. 5 represents an impedance arrangement of the parallel-connected type in accordance with the invention; Fig. 6 is a modification of the Fig. 5 arrangement; Fig. 7 is a further modification of Fig. 5 employed to demonstrate the general construction of any impedance arrangement of the parallel-connected type; Fig. 8 represents another embodiment including the constructional aspects of both the series- and parallel-connected types; Fig. 9 is another form of the series-connected type; Fig. 10 represents an impedance arrangement featuring a re-entrant construction, shown as a special form of the parallel-connected type; and Figs. 11 and 12 are schematic circuit diagrams of two power-measuring bridge circuits, including impedance arrangements of the parallel-connected type.

Referring now more particularly to Fig. 1, there is represented a two-terminal impedance arrangement in accordance with the invention for providing a desired terminal impedance at a given operating wave length. More specifically, the impedance arrangement of Fig. 1 is constructed to be coupled with and to match a transmission line having a predetermined characteristic impedance at a given operating wave length. This transmission line has two conductors, an inner conductor 10 and an outer conductor 11 supported in coaxial alignment by thin dielectric spacers 12 disposed in the inter-conductor space of the line in known manner. Conductors 10 and 11 are selected, as well understood, to have such a ratio of diameters that the transmission line has a desired predetermined characteristic impedance at the operating wave length. This impedance determination varies with the installation and, if the present case be assumed to be utilized for conducting laboratory tests of a transmitter as mentioned above, the characteristic impedance of line 10, 11 preferably is such that the line may be coupled to the output circuit of the transmitter with matched impedances. In general, the line has negligibly low losses and its characteristic impedance is predominantly resistive.

The two-terminal impedance arrangement of Fig. 1 for matching line 10, 11 and for providing a dummy antenna or load for a transmitter under test comprises a pair of impedance devices subject to impedance variations in the same sense with variations in operating conditions. As will be clear from the following description, each impedance device may comprise a single resistor or a group of resistors. Therefore, the term is used here as a generic expression to define either resistive arrangement.

The impedance devices of Fig. 1 are a pair of substantially identical resistors 15 and 16, individually having a value substantially equal to one-half of the terminal impedance desired to be established. The impedance arrangement includes an impedance-inverting section shown as a two-conductor transmission-line section having the same conductor arrangement as line 10, 11, that is, an impedance-inverting transmission-line section of the coaxial type for the embodiment under consideration. This line section has an inner conductor 17 and an outer conductor 18 maintained in coaxial alignment by dielectric spacers 19. One end of inner conductor 17 and outer conductor 18 is serially connected through one of the resistors, resistor 15, to a pair of terminals through which the impedance arrangement is coupled to the terminal end of transmission line 10, 11. One terminal of this pair is indicated at 20, the common junction of resistor 15 and inner conductor 10 of the first-mentioned transmission line. The other terminal is designated by numeral 21. It does not have the appearance of a conventional terminal because with the illustrated arrangement it is mechanically and electrically expedient to unite the adjoining ends of conductors 11 and 18 to form a single conductive member, affording optimum circuit connections between its conductive portions. However, it will be understood that in a more general construction, one end of conductor 18 constitutes one terminal of the two-terminal impedance arrangement. The opposite end of impedance-inverting transmission-line section 17, 18 is terminated in the other resistor, namely, resistor 16, which is coupled directly between one end of conductor 17 and a closed end of conductor 18. With the described construction the outer conductors 11 and 18 shield resistors 15 and 16 which is a desirable feature for many installations.

The impedance-inverting transmission-line section 17, 18 has at the operating wave length an impedance-inverting characteristic causing impedance variations in the same sense of the pair of resistors 15 and 16 to at least partially cancel one another at terminals 20, 21. This impedance-inverting property, to be described more particularly hereinafter, is obtained by constructing line section 17, 18 to have a characteristic impedance equal to the value of resistor 15 and a length such that the spacing of resistor 16 from terminals 20, 21 exceeds that of resistor 15 by substantially an odd integral multiple of one-quarter of the operating wave length. This spacing is achieved by proportioning the length of conductors 17 and 18 to obtain a transmission-line section having an electrical length equal to an odd integral multiple ($n'$) of one-quarter of the operating wave length, as indicated in the drawings.

The described arrangement terminates transmission line 10, 11 in its characteristic impedance. This is so because resistor 15 is connected in series relation with transmission-line section 17, 18 to the terminal ends of line conductors 10, 11 and each of these serially connected elements represents a resistance corresponding to one-half the characteristic impedance of line 10, 11. Consequently, the transmitter under test (not shown) is connected with matched impedances to its dummy antenna or load provided by the impedance arrangement. This optimum condition of impedance matching is substantially maintained even though the power output of the transmitter, which is dissipated in resistors 15 and 16, may tend to increase the temperature and the specific resistance of these elements. This will be apparent from the following consideration.

It may be shown that a transmission-line section having an electrical length equal to an odd integral multiple of one-quarter of its operating wave length transforms a load impedance connected to one of its terminals and having a value different from the characteristic impedance of the section to an inverted value at its opposite terminals. For example, a low resistance coupled at one end of the section appears as a high resistance at the opposite end and vice-versa. This impedance-inverting property of the quarter-wave line section causes the impedance-matching arrangement to exhibit a self-compensating characteristic. Assume, for the purposes of discussion, that the power dissipated jointly in resistors 15 and 16 tends to vary their resistance values. Since the resistors are assumed to be identical, they experience similar variations in resistance. An increase in resistor 16 is transformed by line section 17, 18 to a decrease of resistance at terminals 20, 21 which compensates to a first approximation the corresponding increase of resistance at this point contributed by a change of resistor 15. In other words, the impedance-inverting characteristics of transmission-line section 17, 18 invert a positive temperature coefficient of resistor 16, providing at terminals 20, 21 of the impedance arrangement a negative temperature coefficient to compensate the positive temperature coefficient of resistor 15. For this reason, if the impedance at terminals 20, 21 tends to undergo a change in value, as a result of the power dissipation or because of skin effect, or the like, the resistance variations of elements 15 and 16 substantially cancel one another to maintain an approximately constant terminal impedance. Therefore, for the illustrated installation a matched termination is provided for transmission line 10, 11 and for the transmitter under test over a wide range of operating conditions.

The compensation described is also realized with changes in operating wave length. Where the transmitter is to be tested over a range of wave lengths, the electrical length of line section 17, 18 corresponds with an odd integral multiple of one-quarter of the mean wave length.

In general, compensation is effected for any condition in which the values of resistors 15 and 16 vary in the same sense from the characteristic impedance of line section 17, 18. Mention has been made of instances in which the operating wave length is varied and where heat dissipation causes heating up of the resistors. A condition analogous to the latter often arises due to manufacturing errors. For example, it may happen that resistors 15 and 16 are both slightly higher or lower than their rated values because of production defects or tolerances. In that case, compensation is attained as in the similar condition where the resistor values change due to heating.

The Fig. 2 embodiment is generally similar to Fig. 1, corresponding components thereof being designated by the same reference characters. In Fig. 2, however, resistor 15 is connected in series relation with the outer conductor 18 of the transmission-line section to the terminal end of line 10, 11. The pair of terminals of the impedance arrangement is again represented by numerals 20 and 21. Numeral 20 denotes the start of inner conductor 17 which, for this modification, is an extension of inner conductor 10 of the first-mentioned transmission line. Terminal 21 is the junction between the conductor 11 and resistor 15.

It may be convenient or necessary in certain installations to replace either or both of resistors 15 and 16 with resistive networks including a plurality of resistive elements. Such an arrangement is represented in Fig. 3 which is generally similar to Fig. 2, like components thereof being identified by the same reference characters. In this construction transmission-line section 17, 18 is connected to the terminal end of transmission line 10, 11 by means of an impedance device including two resistors 15' and 15''. These elements are so selected that they constitute a total resistance in series with transmission-line section 17, 18 having a value equal to one-half the desired terminal impedance. A convenient constructional form, which is the equivalent of that represented in Fig. 3, includes a resistive disc extending between the outer conductor 18 of the transmission-line section and the outer conductor 11 of transmission line 10, 11. The disc may be a ceramic or any other insulator having a metalized or conductive coating material. The coating may include a conductive component such as graphite and is selected so that the disc is the full equivalent of the series resistor 15 of Figs. 1 and 2.

In similar manner, the transmission-line section 17, 18 is effectively terminated at one end in its characteristic impedance by means of resistors 16' and 16''. The extensions 17' and 18' of the conductors of the transmission-line section provide a shield for the resistive network of elements 16' and 16''. This shield is a short-circuited line section having an electrical length approximately equal to one-quarter of the operating wave length and thus has no adverse effect on the termination of the section 17, 18. In like manner, the outer conductor of transmission line 10, 11 is extended, as indicated at 11', to provide a quarter-wave shield for the resistive network of elements 15' and 15''.

In each of the described embodiments the two-terminal arrangement includes a pair of impedance devices and an impedance-inverting section connected at one end in series relation with one device to the terminal pair 20, 21. This may be considered as an impedance arrangement of the "series-connected" type. It is not limited to the use of a single pair of impedance devices although at least two are required to realize the compensation mentioned above. The series-type construction including any desired number of such devices will be described with reference to Fig. 4.

In this figure, the impedance arrangement is again utilized to match the coaxial transmission line 10, 11. It includes a plurality $m$ of similar impedance devices, individually having a value of $$\left(\frac{1}{m}\right)$$

times the desired terminal impedance. Three resistors 15a, 15b, and 15c have been illustrated. The arrangement also includes an impedance-inverting transmission-line section connected at one end in series relation with one device to terminals 20, 21, terminated at its opposite end in another of the devices and having (m—1) intermediate line portions connected in cascade by the remaining impedance devices. As illustrated, the impedance-inverting transmission-line section is connected at one end in series relation with the resistor 15a to terminals 20, 21 and is terminated at its opposite end in resistor 15c. It has two intermediate line portions 17a, 18a and 17b, 18b connected in cascade through resistor 15b which directly couples the inner conductors 17a and 17b. The outer conductors 18a and 18b are connected in the same manner as the outer conductor of transmission line 10, 11 and the first line portion 17a, 18a. The intermediate line portions have the same electrical lengths, equal to $$\left(\frac{n}{m}\right)$$

times one-half of the operating wave length, where $n$ is any integer and $m$ is the number of impedance devices which is any integer at least equal to two. The characteristic impedance of each intermediate line portion is approximately equal to $$\left(\frac{K}{m}\right)$$

times the desired terminal impedance, where $K$ is the number of impedance devices connected to that end of a given intermediate line portion remote from terminals 20, 21.

Applying the above-recited criteria to the illustrated embodiment and assuming $n$ to be equal to one, the exact construction including three impedance devices is readily determined. The electrical length of each of the intermediate line portions 17a, 18a and 17b, 18b is equal to one-sixth of the operating wave length. The characteristic impedance of line portion 17a, 18a is equal to two-thirds, and that of line portion 17b, 18b is equal to one-third the desired terminal impedance. Each device or resistor 15a, 15b and 15c also has a value of one-third the desired terminal impedance. The arrangement terminates transmission line 10, 11 in its characteristic impedance and it may be shown that a compensation similar to that described in connection with Fig. 1 is obtained.

The general expressions set forth in the discussion of Fig. 4 are equally applicable to the special cases of Figs. 1, 2 and 3. In any such case the integer $m$ is equal to two. Thus, as already described, the impedance devices in each such embodiment individually have a value equal to one-half of the desired terminal impedance, the impedance-inverting transmission-line section 17, 18 has a characteristic impedance of the same value, and an electrical length corresponding to any odd integral multiple of one-quarter of the operating wave length.

The impedance arrangement of Fig. 5 is of the parallel-connected type. It includes the same elements as Fig. 1 but their arrangement and values are modified as follows. One end of the inner and outer conductors of impedance-inverting section 17, 18 is connected in parallel with one resistor 23 to the terminal pair 20, 21. The other end of the line section is terminated in an identical resistor 24. Resistors 23 and 24 individually have a value substantially equal to twice the desired terminal impedance, and the characteristic impedance of transmission-line section 17, 18 is equal to the value of resistor 24. The electrical length of this line section is equal to any odd integral multiple $n'$ of one-quarter of the operating wave length. This arrangement provides an impedance at terminals 20, 21 which matches the characteristic impedance of transmission line 10, 11 and is self-compensating in the manner explained in connection with Fig. 1.

From a comparison of Figs. 1 and 5 it will be clear that a pair of similar impedance devices, subject to impedance variations in the same sense with variations in operating conditions, and an impedance-transforming section may be associated to provide an impedance arrangement of simplified construction of either the series-connected or parallel-connected type. In either construction the characteristic impedance of the impedance-inverting transmission-line section corresponds with the impedance value of the two devices. Its electrical length is chosen to obtain such an impedance-inverting characteristic that impedance variations in the same sense of the pair of impedance devices cancel at the input terminals of the arrangement. The values of these devices, in turn, are selected with reference to the desired terminal impedance and the type of connection, whether series or parallel, between the one device and the terminal end of the impedance-inverting section so that the desired impedance is established at the terminals of the arrangement at the operating wave length.

Fig. 6 represents a modification of the parallel-connected type in which substantially identical resistors 25 and 26 are located in different but parallel-connected coaxial-line arrangements. Resistor 25 is coupled to terminals 20, 21 of the impedance arrangement through a coaxial transmission line having an outer conductor 27 and inner conductor 28. This line section is terminated in its characteristic impedance by the resistive element 25 which has a value equal to twice the desired terminal impedance. This resistor is formed of a resistive element 25a having a uniform diameter and a uniform resistance per unit length enclosed within a tapered conductive shield. The resistivity of element 25a and the shape of the shield as well as the electrical length of the composite unit are selected so that the input impedance of resistive element 25 has a desired value. Resistor 26 has the same construction and is effectively coupled in parallel with resistor 25 at terminals 20, 21 through a line section having an inner conductor 29 and an outer conductor 30. Compensation of impedance variations of resistors 25 and 26 is obtained by selecting the electrical length of line section 29, 30 so that resistor 26 has a spacing from terminals 20, 21 exceeding that of resistor 25 by any odd integral multiple of one-quarter of the operating wave length. The extended portions of outer conductors 27 and 30, projecting beyond resistive elements 25 and 26, serve as shields.

An impedance arrangement of the parallel-connected type requires at least two impedance devices to be self-compensating but may have any greater number desired. The construction using any desired number of such devices will be given with reference to Fig. 7. The general parallel-connected arrangement includes a plurality $m$ of similar impedance devices individually having a value of $m$ times the desired terminal impedance. As illustrated, three identical resistors 23a, 23b, and 23c are used. The impedance-inverting section is connected at one end in parallel relation with one resistor, 23a, to the terminals 20, 21 and is terminated at its opposite end in another resistor 23c. It has $m$—1 intermediate line portions connected in parallel with the remaining resistor 23b. The intermediate line portions are 17a, 18a and 17b, 18b. They have the same electrical lengths equal to $$\left(\frac{n}{m}\right)$$

times one-half of the operating wave length, as in the arrangement of Fig. 4. The characteristic impedance of any of the intermediate line portions is equal to $$\left(\frac{m}{K}\right)$$

times the desired terminal impedance where K is number of impedance devices connected to that end of the particular intermediate line portion remote from terminals 20, 21. The characteristic impedances of line portions 17a, 18a and 17b, 18b in the illustrated case are three-halves and three times, respectively, the desired terminal impedance. It may be readily demonstrated that the arrangement of Fig. 5 is but a special form of the general parallel-connected type just described.

The impedance arrangement of Fig. 8 combines features of both the series- and parallel-connected types of Figs. 4 and 7. Corresponding parts of these arrangements are identified by similar reference characters. In Fig. 8 one end of the intermediate-line portion 17a, 18a is is connected in series relation with a first resistor 31a to the terminal pair 20, 21. The opposite end of the transmission-line section is terminated in a resistor 31c. The intermediate portions 17a, 18a and 17b, 18b are connected in parallel relationship with a third resistor 31b. The electrical lengths of these line portions are, preferably, as recited in connection with Figs. 4 and 7. The values of resistors 31a, 31b and 31c as well as the characteristic impedances of the intermediate portions of the inverting transmission-line section are selected to establish the desired terminal impedance. While this result may be obtained with a wide combination of impedance values, for the illustrated embodiment resistor 31a has a value of one-third of the desired terminal impedance and resistors 31b and 31c are individually equal to four-thirds this impedance. With this resistor combination, the characteristic impedance of line portion 17a, 18a is equal to two-thirds the desired impedance while portion 17b, 18b has a characteristic impedance equal to the value of resistor 31c.

In Fig. 9 there is represented a further impedance arrangement which is generally similar to that of Fig. 1 but has a modified impedance-inverting section. Similar elements of these figures are designated by the same reference characters. The network enclosed within the broken-line rectangle 17 comprises the impedance-inverting section which may be shown to have an impedance-inverting characteristic substantially the same as the aforedescribed impedance-inverting line sections. The modified arrangement includes similar series-connected inductors $L_1$ and $L_2$ and an intermediate shunt condenser $C_1$, individually representing a reactive impedance equal to one-half the desired terminal impedance. Since the arrangement is of the series-connected type, resistors 15 and 16 likewise are equal in value to half the desired terminal impedance. This modification compensates for like variations of resistors 15 and 16 in a manner analogous to the arrangement of Fig. 1.

Unit 17 of Fig. 9 may be considered to have a characteristic impedance equal to the impedance of element 16. In general, any such impedance-transforming network satisfies the expression:

$$Z^2 = Z_1 Z_2 \qquad (1)$$

where Z is the pivotal impedance value or characteristic impedance of the network; $Z_1$ is the impedance at one pair of its terminals; and $Z_2$ is the impedance at the other terminals.

Any of the described embodiments even the general constructional Figs. 4, 7 and 8, may be viewed a little differently. Consider, for example, the specific form of Fig. 8. This arrangement may be considered as comprising a pair of impedance devices. The first of this pair is resistor 31a and the other may be thought of as resistor 31b in combination with transmission-line section 17b, 18b and its terminating resistor 31c. Analyzing the arrangement in this fashion, the impedance-inverting section comprises the conductor section 17a, 18a. This section is connected at one end with resistor 31a to the terminal pair 20, 21. It is terminated at its opposite end in the remaining impedance device and has a characteristic impedance equal to the impedance of this other device. The electrical length of the line section is such that like variations of the pair of impedance devices at least partially cancel at the terminal pair 20, 21. The values of the impedance devices are selected with reference to the desired terminal impedance and the type of connection between the first device 31a and the transmission-line section 17a, 18a, so that the desired terminal impedance is established at the operating wave length.

An impedance arrangement in accordance with the invention has many desirable advantages. It permits the use of like impedance devices while effecting a compensation for variations in the same sense of the devices due, for example, to the dissipation of power therein. This feature is very desirable since it avoids the necessity of using impedance elements critically selected to have compensating impedance characteristics. Furthermore, through the use of the simplified constructions of the type of Figs. 1 and 5 in which the impedance-inverting section 17, 18 has an electrical length of one-quarter of the operating wave length, the arrangement may have a relatively small physical size. Additionally, the invention is adapted to take any of a variety of constructional arrangements which renders it flexible as to use.

In Fig. 10, for example, transmission line 10, 11 is terminated in an impedance arrangement having a re-entrant construction and shown as a special form of the parallel-connected type. In this embodiment the impedance-inverting transmission-line section includes a first conductive member comprising conductive portions 35, 36 and 37 which are assembled to form a single conductor folded back upon itself. It also includes a second conductive member 38 disposed within the folded-back portions of the first member and forming therewith a re-entrant transmission-line section having an electrical length corresponding to any odd integral multiple $n'$ of one-quarter of the operating wave length, as indicated in the drawing. One end of this section is connected in parallel relation with resistors 23' and 23" to the terminals 20, 20 and 21, 21. The other end is terminated in its characteristic impedance by resistors 24' and 24". Each of the resistors has a value of four times the desired terminal impedance. This structure is especially suited for making power measurements on apparatus coupled to the remote terminals of transmission line 10, 11. For this purpose, each of the resistors 23', 23'', 24' and 24'' may consist of an incandescent lamp, forming a conventional load-lamp termination. Portion 36 of the transmission-line section, preferably has a screen-type construction and the surfaces of conductive elements 35, 37 and 38 are highly polished to direct light from the load lamps to a photoelectric pick-up device (not shown) disposed adjacent the screen 36. One advantage to this construction resides in the fact that all of the lamps are equidistant from screen 36 and the photoelectric pick-up.

A power-measuring bridge circuit including the invention is shown schematically in Fig. 11. The branches of the bridge circuit include the following: a resistor 40; serially connected identical resistors 41 and 42; a resistor 43; and indentical resistors 44 and 45 connected in series and having the same value and characteristics as resistors 41 and 42 of the opposite branch. The several branches have the same resistance value and have a direct current connection with a battery 46 coupled to a pair of diagonally opposed terminals 47 and 48, in conventional manner. Resistor 40 is adjustable to facilitate establishing a direct current balance in the bridge circuit. This balance may be determined by a meter 51 coupled to the terminals 49 and 50. A transmission line, having an inner conductor 52 and a coaxially arranged outer conductor 53, supplies signal energy to the bridge circuit. To this end, resistor 41 is coupled across the line conductors by means of bushing-type condensers 54 and 55. Resistor 42 is similarly coupled across the line conductors through condensers 54' and 55'. Each of resistors 41 and 42 represents an impedance corresponding to four times the characteristic impedance of line 52, 53.

A first U-shaped conductive member 56, including elements of additional bushing-type condensers 57 and 58, completes the circuit of inner conductor 52 between condensers 55 and 55'. A similar U-shaped conductive member 59, including elements of other bushing-type condensers 57' and 58', completes the circuit of the outer line conductor 53 between condensers 54 and 54'. The portions of conductive members 56 and 59 located between the bushing-type condensers constitute an impedance-inverting transmission-line section terminated in its characteristic impedance by resistors 44 and 45. This line section has an electrical length equal to any odd integral multiple of one-quarter of the operating wave length and in association with resistors 41, 42, 44 and 45 defines a parallel-type impedance arrangement in accordance with the invention.

In utilizing the bridge circuit, resistor 40 is adjusted to indicate a direct current bridge balance, that is, a condition in which the resistive values of the several branches are substantially identical. Signal energy is applied from transmission line 52, 53 to resistors 41, 42, 44 and 45. The dissipation of signal energy in the resistors upsets the direct current balance of the bridge circuit. However, due to the resistance compensation afforded by the impedance arrangement of the invention, the bridge nevertheless represents a constant impedance termination for transmission line 52, 53. The extent of the unbalance in direct current resistance is indicated on meter 51 which may be calibrated in terms of power. Therefore, the bridge arrangement provides direct indications of the power level of the applied signal energy, and at the same time maintains a proper termination for transmission line 52, 53.

A modified form of power-measuring bridge circuit is shown schematically in Fig. 12. It is generally similar to that of Fig. 11 and like components thereof are identified by the same reference characters. In Fig. 12 a single resistor is included in each branch of the bridge, each such resistor having a value equal to twice the characteristic impedance of line 52, 53. Also, portions 56' and 59' of the conductors forming the impedance-inverting transmission-line section are short-circuited at one end by means of a conductive element 61, providing a shield for the resistors 41 and 45 in which the applied signal energy is dissipated. There are a variety of elements which may be used as the power-dissipating resistors in the power-bridge measuring circuits. Filaments, whether incandescent or not, may be used and crystal detectors are also suitable. Likewise, a "thermistor" may be employed. A thermistor is a conductive alloy which is sensitive to temperature and may be thought of as a resistor having a high temperature coefficient.

In certain of the illustrated embodiments, the impedance arrangement includes at least one transmission-line section said to have a particular characteristic impedance. As is well understood in the art, this characteristic impedance of a desired value may be realized by appropriately selecting the conductor diameters of the transmission-line section. In the case of a coaxial-line section, the conductors are selected to establish a particular ratio of conductor diameters.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A two-terminal impedance arrangement for providing a desired terminal impedance at a given operating wave length comprising, a pair of substantially identical resistors, and an impedance-inverting section connected at one end in a circuit connection of one type with one of said resistors to said terminals, terminated at its opposite end in the other of the said resistors, and having at said wave length an impedance-inverting characteristic causing resistance variations in the same sense of said pair of resistors to at least partially cancel one another at said terminals, and the values of said resistors being selected with reference to said desired impedance and the type of connection between said one resistor and said impedance-inverting section, so that said desired impedance is established at said terminals of said arrangement at said wave length.

2. A two-terminal impedance arrangement for providing a desired terminal impedance at a given operating wave length comprising, a pair of resistive devices individually having a value substantially equal to one-half of said desired impedance and subject to resistance variations in the same sense with variations in the operating conditions of said arrangement, and an impedance-inverting transmission-line section connected at one end in series relation with one of said devices to said terminals, terminated at its opposite end in the other of said devices, and having at said wave length a characteristic impedance approximately equal to the value of said other device and an electrical length such that the spacing of said other device from said terminals exceeds that of said one device by substantially an odd integral multiple of one-quarter of said wave length, so that said desired impedance is established at said terminals of said arrangement at said wave length.

3. A two-terminal impedance arrangement for providing a desired terminal impedance at a given operating wave length comprising, a pair of resistive devices individually having a value substantially equal to one-half of said desired impedance and subject to resistance variations in the same sense with variations in operating conditions of said arrangement, and an impedance-inverting transmission-line section connected at one end in series relation with one of said devices to said terminals, terminated at its opposite end in the other of said devices, and having at said wave length a characteristic impedance approximately equal to the value of said other device and an electrical length such that the spacing of said other device from said terminals exceeds that of said one device by substantially one-quarter of said wave length, so that said desired impedance is established at said terminals of said arrangement at said wave length.

4. A two-terminal impedance arrangement for providing a desired terminal impedance at a given operating wave length comprising, a pair of resistive devices individually having a value substantially equal to one-half of said desired impedance and subject to resistance variations in the same sense with variations in operating conditions of said arrangement, and an impedance-inverting transmission-line section connected at one end in series relation with one of said devices to said terminals, terminated at its opposite end in the other of said devices, and having at said wave length a characteristic impedance approximately equal to the value of said other device and an electrical length substantially equal to an odd integral multiple of one-quarter of said wave length, so that said desired impedance is established at said terminals of said arrangement at said wave length.

5. A two-terminal impedance arrangement for providing a desired terminal impedance at a given operating wave length comprising, a plurality $m$ of resistive devices individually having a value of $$\left(\frac{1}{m}\right)$$

times said desired impedance and subject to resistance variations in the same sense with variations in operating conditions of said arrangement, and an impedance-inverting transmission-line section connected at one end in series relation with one of said devices to said terminals, terminated at its opposite end in another of said devices, and having $m-1$ intermediate line portions connected in cascade by means of the remaining ones of said devices, said intermediate line portions individually having at said wave length an electrical length of $$\left(\frac{n}{m}\right)$$

times one-half of said wave length and a characteristic impedance approximately equal to $$\left(\frac{K}{m}\right)$$

times said desired impedance, where $m$ is an integer at least equal to two, $n$ is an integer, and $K$ is the number of resistive devices connected to that end of the intermediate line portion remote from said terminals.

6. A two-terminal impedance arrangement for providing a desired terminal impedance at a given operating wave length comprising, a pair of resistive devices individually having a value substantially equal to twice said desired impedance and subject to resistance variations in the same sense with variations in operating conditions of said arrangement, and an impedance-inverting transmission-line section connected at one end in parallel relation with one of said devices to said terminals, terminated at its opposite end in the other of said devices, and having at said wave length a characteristic impedance approximately equal to the value of said other device and an electrical length substantially equal to an odd integral multiple of one-quarter of said wave length, so that said desired impedance is established at said terminals of said arrangement at said wave length.

7. A two-terminal impedance arrangement for providing a desired terminal impedance at a given operating wave length comprising, a pair of resistive devices individually having a value substantially equal to twice said desired impedance and subject to resistance variations in the same sense with variations in operating conditions of said arrangement, and an impedance-inverting transmission-line section connected at one end in parallel relation with one of said devices to said terminals, terminated at its opposite end in the other of said devices, and having at said wave length a characteristic impedance approximately equal to the value of said other device and an electrical length substantially equal to one-quarter of said wave length, so that said desired impedance is established at said terminals of said arrangement at said wave length.

8. A two-terminal impedance arrangement for providing a desired terminal impedance at a given operating wave length comprising, a plurality $m$ of resistive devices individually having a value of $m$ times said desired impedance and subject to resistance variations in the same sense with variations in operating conditions of said arrangement, and an impedance-inverting transmission-line section connected at one end in parallel relation with one of said devices to said terminals, terminated at its opposite end in another of said devices, and having $m-1$ intermediate line portions connected in parallel with the remaining ones of said devices, said intermediate line portions individually having at said wave length an electrical length of $$\left(\frac{n}{m}\right)$$

times one-half of said wave length and a characteristic impedance approximately equal to $$\left(\frac{m}{K}\right)$$

times said desired impedance, where $m$ is an integer at least equal to two, $n$ is an integer, and $K$ is the number of resistive devices connected to that end of the intermediate line portion remote from said terminals.

9. A two-terminal impedance arrangement for providing a desired terminal impedance at a given operating wave length comprising, a pair of resistive devices individually having a value substantially equal to twice said desired impedance and subject to resistance variations in the same sense with variations in operating conditions of said arrangement, a first conductive member folded back upon itself to provide a pair of spaced concentric portions and a second conductive member disposed within the folded-back portions of said first member and forming therewith a re-entrant impedance-inverting transmission-line section connected at one end in parallel relation with one of said devices to said terminals and terminated at its opposite end in the other of said devices, said transmission-line section having at said wave length a characteristic impedance approximately equal to the value of said other device and an electrical length substantially equal to an odd integral multiple of one-quarter of said wave length, so that said desired impedance is established at said terminals of said arrangement at said wave length.

HAROLD A. WHEELER.

REFERENCES CITED

The following references are of record in the file of this patent:

UNITED STATES PATENTS

| Number | Name | Date |
|---|---|---|
| 2,030,179 | Potter | Feb. 11, 1936 |
| 2,151,157 | Schelkunoff | Mar. 21, 1939 |
| 2,396,708 | Leeds | Mar. 19, 1946 |
| 2,425,084 | Cork et al. | Aug. 5, 1947 |

FOREIGN PATENTS

| Number | Country | Date |
|---|---|---|
| 489,704 | Great Britain | Aug. 2, 1938 |